United States Patent
Braun (10) Patent No.: US 10,175,702 B2
(45) Date of Patent: Jan. 8, 2019

(54) MONITORING SYSTEM AND METHOD FOR FLUID-CARRYING PRODUCTION SYSTEM

(71) Applicant: Fresenius Medical Deutschland GmbH, Bad Homburg (DE)

(72) Inventor: Christian Braun, Neustadt a. d. Weinstrasse (DE)

(73) Assignee: FRESENIUS MEDICAL CARE DEUTSCHLAND GMBH, Bad Homburg (DE)

( * ) Notice: Subject to any disclaimer, the term of this patent is extended or adjusted under 35 U.S.C. 154(b) by 230 days.

(21) Appl. No.: 15/109,452

(22) PCT Filed: Dec. 18, 2014

(86) PCT No.: PCT/EP2014/078407
§ 371 (c)(1),
(2) Date: Jul. 1, 2016

(87) PCT Pub. No.: WO2015/104156
PCT Pub. Date: Jul. 16, 2015

(65) Prior Publication Data
US 2016/0334806 A1   Nov. 17, 2016

(30) Foreign Application Priority Data

Jan. 9, 2014  (DE) .......... 10 2014 000 276

(51) Int. Cl.
| | |
|---|---|
| *G05D 7/00* | (2006.01) |
| *G05D 7/06* | (2006.01) |

(Continued)

(52) U.S. Cl.
CPC .......... *G05D 7/0635* (2013.01); *G05B 13/027* (2013.01); *G05B 23/0256* (2013.01);
(Continued)

(58) Field of Classification Search
None
See application file for complete search history.

(56) References Cited

U.S. PATENT DOCUMENTS

| | | | |
|---|---|---|---|
| 6,306,291 B1 * | 10/2001 | Lueck | B01D 61/12 |
| | | | 210/90 |
| 2005/0274417 A1 | 12/2005 | Perry et al. | |
| 2016/0236122 A1* | 8/2016 | Tange | B63B 13/00 |

FOREIGN PATENT DOCUMENTS

| | | |
|---|---|---|
| DE | 10115991 | 4/2002 |
| DE | 10112138 | 9/2002 |
| EP | 2372169 | 10/2011 |

OTHER PUBLICATIONS

Lin et al. Extension of Power Lines Fault Location Techniques to Pressurized Line Diagnostics. Power Symposium, Sep. 1, 2006, pp. 465-473.

* cited by examiner

*Primary Examiner* — Paul B Yanchus, III
(74) *Attorney, Agent, or Firm* — Jacobson Holman, PLLC.

(57) ABSTRACT

A computer system, a computer-implemented method, and a computer program product determine an operating state of at least one system component in a fluid-carrying, cascading production system. The computer system includes an interface configured to receive a first and a second pressure pulse signal. The first and second pressure pulse signals characterize, respectively, a pressure pulse before and after the pressure pulse passes through the production system. A memory unit stores a plurality of system component-specific transmission functions which describe an operating-state-dependent pulse response of the at least one system component to the pressure pulse. An evaluation unit determines a real transmission function from the first and second (Continued)

pressure pulses, and compares the real transmission function of the production system with the stored plurality of transmission functions for the system components.

20 Claims, 5 Drawing Sheets

(51) Int. Cl.
    *G05B 23/02*     (2006.01)
    *G05B 13/02*     (2006.01)
    *G05D 16/20*     (2006.01)
    *G05D 27/02*     (2006.01)
    *G06F 17/14*     (2006.01)
(52) U.S. Cl.
    CPC .............. *G05D 16/20* (2013.01); *G05D 27/02* (2013.01); *G06F 17/141* (2013.01)

MONITORING SYSTEM AND METHOD FOR FLUID-CARRYING PRODUCTION SYSTEM

BACKGROUND OF THE INVENTION

1. Field of the Invention

The invention relates to electronic data processing in general and specifically to a computer system, a computer program product and a computer-implemented method for monitoring components of a fluid-carrying, cascading production system.

2. Description of Related Art

Sensors for monitoring specific parameters are used after each production step and cleaning step in fluid-carrying, cascading production systems, such as water-processing systems for dialysis. For each sensor-monitored component of the production system, these sensors supply measured data that can be used to determine the operating status of the respective components. One example of such a specific parameter is the pressure difference between the input pressure of a specific component and the output pressure of that specific component. For example, when the sand filter is filled with cleaned sand, this pressure difference is different from that when the sand filter is contaminated with particles washed into it. An inference about the operating status of the respective component can thus be drawn from the specific parameter (e.g., pressure difference). In the case of monitoring of the specific parameters for the individual components of the cascading production system, it is possible to monitor the functionality of the production system remotely and optionally to plan and prepare for service or repair jobs. Such complex monitoring systems generally use two sensors per component, where the first sensor measures the input value of the specific parameter and the second sensor measures the output value of the parameter for the respective component. A great many sensors are thus required for cascading production systems, thus resulting in a great system complexity and also a large volume of measured data.

SUMMARY OF THE INVENTION

There is therefore a demand for a computer-assisted system of a low level of complexity for monitoring system components in fluid-carrying, cascading production systems with a simultaneous reduction in the volume of measured data associated with such monitoring.

This problem is solved by the features of the independent claims. One embodiment relates to a computer system for determining an operating state of a system component in a fluid-carrying, cascading production system. Examples of such fluid-carrying, cascading production systems include water-processing plants, refineries, chemical process plants or other plants in which a fluid to be processed is modified and/or worked up by means of a plurality of cascading system components (e.g., filters, pumps, etc.) of the production system.

The computer system comprises an interface for receiving a first pressure pulse signal and a second pressure pulse signal. The first pressure pulse signal characterizes a pressure pulse before it passes through the production system, and the second pressure pulse signal characterizes the pressure pulse after it passes through the production system. For example, this pressure pulse can be triggered by the computer system itself by means of a control signal to a corresponding system component (e.g., pump) of the production system. However, the pressure pulse may also be triggered manually by a user of the production system or in predefined intervals by the production system itself. A pressure pulse may be in the form of a short-term increase in pressure, for example, in which the pressure drops rapidly back to the level of the original condition. However, other pulse forms are also possible such as an echelon form in which the pressure is increased suddenly from the original level to a higher level, which is then maintained for a longer period of time. This period of time comprises the length of the pulse responses of the system components.

The pressure parameter is an example of a measured physical variable, which is present continuously for the entire production system. Other physical measured parameters may also be used. For example, in addition to pressure measuring sensors, it is also possible to use sensors for determining chemical and/or physical parameters, such as the chlorine content, water hardness, iron content, pH or similar parameters, whose value is influenced by passing through a system component. Those skilled in the art are capable of transferring or expanding the principle explained below on the basis of the pressure parameter to other technical parameters that characterize the system.

The pressure pulse is generated at a location in the production system which is upstream from the other system components of the production system with regard to the direction of propagation of the pressure wave triggered by the pressure pulse. Such system components may be, for example, certain filter components for cleaning the fluid or for chemically altering the fluid. In one embodiment, the first pressure pulse signal is detected by a first pressure sensor of the production system, which is installed between the pressure-pulse-generating component and the other system components. The second pressure pulse signal is detected by a second pressure sensor of the production system, which is installed after the last system component with regard to the direction of propagation of the pressure wave triggered by the pressure pulse. In an alternative embodiment, the first pressure pulse signal may be detected directly by the pressure-pulse-generating component, which thus fulfills the function of the first pressure sensor. The measured values are thus required by only two measurement points, which characterize the change in the pressure pulse over all the components present in the production system for the entire system.

The computer system additionally comprises a memory unit for storing a plurality of transmission functions. A stored transmission function describes an operating-state-dependent pulse response to the pressure pulse from at least one of the system components of the production system. In general, a transmission function describes mathematically the relationship between the input signal and the output signal of a dynamic system in the frequency space, for example. In the context of the production system, each system component may be understood as a subsystem. With the help of the transmission function, the output signal (altered pressure pulse), i.e., the response of the corresponding system component, may be determined for any input signal (pressure pulse). The time-delayed response of the output signal to the input signal is typical of the system behavior.

The transmission function of a system component is a function of the frequency, i.e., it describes which change each individual frequency of the input signal undergoes. With this it is possible to calculate how any input signal is converted by the system component and/or which output signal it triggers. Transmission functions for calculating the reaction of a system can be applied to all systems that can be represented by linear differential equations. A system component, for example, a sand filter, may have a typical damping behavior, for example, which dampens the pressure pulse differently, depending on the degree of contamination of the filter with illuviated particles. For each system component, one or more transmission functions may be stored in the memory unit, these functions describing, for example, the pulse response of the system component in the ideal operating state (cleaned) or in operating states that deviate from the ideal state (slightly contaminated, highly contaminated, cleaning run, etc.).

Examples of frequently used transmission functions include: Butterworth filters, Bessel filters, Cauer filters, Tschebyscheff filters, Gaussian filters, raised-cosine filters, P elements, I elements, D elements, PT1 elements, PT2 elements or dead-time elements.

The computer system additionally comprises an evaluation unit for determining a transmission function for the production system from the first and second pressure pulse signals. The two pressure pulse signals describe the change in the pressure pulse over all the system components, so the signal difference constitutes a measure of the pulse response of the overall system. The transmission function of the overall system thus contains the frequency components, which are associated with the pulse responses of the individual system components. The individual system components trigger component-specific pulse responses based, on their specific damping characteristics, so component-specific frequency spectra also correlate with the respective system components. The transmission function of the system as a whole can be calculated from the individual transmission functions of the various system components. If the transmission function for the entire production system is calculated on the basis of the system-component-specific transmission functions that describe their undisturbed operating state, then the transmission function of the system as a whole is obtained for the undisturbed operating state. The evaluation unit may thus determine whether the production system is in an undisturbed operating state by comparing the transmission function for the production system, determined on the basis of the measured value, with the overall transmission function for the production system, calculated on the basis of the individual system component-specific transmission functions. If the evaluation component in this comparison finds deviations from the undisturbed operating state, then it is possible to ascertain, by means of frequency spectral analysis, which system component(s) is/are responsible for the deviation(s). The operating state of this specific system component of the production system can ultimately be determined on the basis of the transmission functions for a specific system component of the production system. For example, the evaluation unit can calculate the transmission function for the overall production system again after the specific system component has been determined by means of frequency spectral analysis, and the component-specific transmission function for a not undisturbed operating state of the system component may be used in the process. If the overall system transmission function thus calculated then adequately matches the overall system transmission function determined from the measured value, the operating state of the specific component can be calculated from that.

The term "disturbance" here refers in general to a deviation from the ideal operating state. In this sense, special operating states are also considered to be a disturbance, even if these operating states have been intentionally induced. Thus, for example, a cleaning state of a system component would also fall under this heading, because the pulse response of this component during a rinsing operation, for example, deviates from the pulse response during normal production operation.

Additional aspects of the present invention include a computer-implemented method, which can be executed by the computer system described here, as well as a computer program product with instructions that can be processed by said computer system, so that the computer-implemented method is carried out accordingly.

Additional advantageous embodiments of the invention are defined in the dependent claims.

DETAILED DESCRIPTION OF THE PREFERRED EMBODIMENTS

Further scope of applicability of the present invention will become apparent from the detailed description given hereinafter, However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
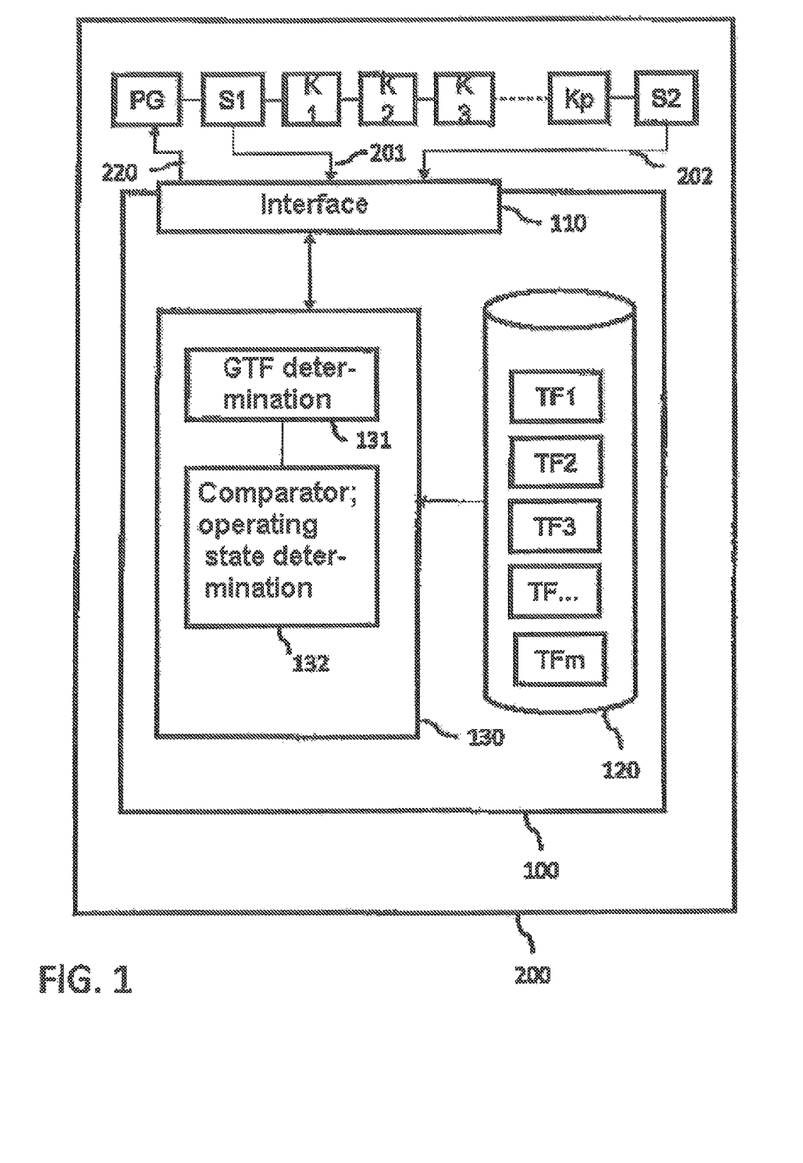
FIG. 1 shows an exemplary embodiment of the computer system according to the invention for monitoring system components of a production system.

FIG. 1 shows an exemplary embodiment of the computer system 100 according to the invention for monitoring system components K1 to Kp of a production system 200.

The fluid-carrying, cascading production system 200 includes a plurality of system components installed in a cascading arrangement suitable for processing the fluid carried by the production system 200. Each system component performs a processing step, which serves to process or convert the fluid. The system components may be arranged sequentially in a cascade, as shown in the exemplary embodiment, but branches may also be provided, which parallel the fluid path in segments, such that the parallelized paths are merged again in the last step of the cascade Kp at the latest.

One example of the fluid-carrying, cascading production system 200 is a water-processing system for dialysis. Examples of system components K1 to Kp of such a water-processing system arranged in a cascade include an untreated water inlet unit, untreated water tank, media filter, particle filter, water softener, activated carbon filter, deep filter cartridges, coarse filters or spiral filters.

The production system 200 is equipped with two sensors S1, S2. The sensors S1, S2 are used for monitoring specific technical parameters of the production system 200. Examples of such technical parameters include the pressure at the start of the production cascade and at the end of the production cascade or chemical parameters, for example, the chlorine content, the degree of water hardness, the iron content or the pH of the fluid, each measured at the start of the production cascade and at the end of the production cascade. In one embodiment, the sensors S1 and S2 are implemented as pressure sensors, which function as pulse pickup units to generate a first and a second pressure pulse signal 201, 202, such that the first pressure pulse signal 201 characterizes a pressure pulse before passing through the production system 200 and the second pressure pulse signal 202 characterizes the pressure pulse after passing through the production system 200. The pressure pulse can be generated by a pulse generator unit PG. Such pressure pulse generators are well known in the state of the art and can generate pressure pulses of different forms, for example, peak form 210, jump form 211 or ramp form 212 (cf. FIG. 2). The pulse generator may be triggered or cycled from the outside (for example, by computer system 100). The response, i.e., the time function at the output, is referred to as the pulse response. However, it is also possible to trigger the pulse generator PG by internal clocking (for example, at regular intervals of time). In an alternative embodiment, the pulse generator PG may assume the function of the first pressure sensor S1. Since the pulse generator already knows the pressure curve triggered by the pressure pulse, the pressure pulse signal associated with it can be generated as an output pulse of the pulse generator.

The pressure pulse signals 201, 202 generated by the two sensors S1, S2 and/or by the pulse generator PG and the second pressure sensor S2 can be received by the computer system over a suitably configured interface 110 of a computer system 100. This computer system 100 may be an integrated component of the production system 200 (as shown in FIG. 1), but the computer system may also be an independent system, which is merely linked to the production system by communication. Transmission of the sensor signals 201, 202 of the production system 200 to the computer system 100 may be accomplished with standard communication techniques, e.g., a data bus or a wireless connection, by means of a suitable communication protocol. This also permits monitoring or maintenance planning of production system 200 from a remote location.

The computer system 100 additionally comprises an evaluation unit 130 having a GTF determination component 131, which determines a real transmission function GTF for the production system 200 on the whole from the first and second pressure pulse signals 201, 202. The first pressure pulse signal directly represents the pulse characteristic of the pressure pulse generated by the pulse generator PG. However, the second pressure pulse signal 202 represents the pulse response of the overall system 200 to the pressure pulse generated originally. The transmission function GTF associated with the pulse response can thus also be calculated from the pulse response of the production system 200 as a whole. This can be done, for example, with a frequency spectral analysis using Fourier transforms. Variants of the Fourier transform, e.g., the Fourier series, the continuous Fourier transform, the discrete Fourier transform (DFT) or discrete-time Fourier transform (DTFT) signals may also be used.

The computer system 200 additionally comprises a memory unit 120, which is configured to store a plurality of transmission functions TF1 to TFm. A corresponding memory area of the computer memory may be used for the memory unit. Transmission functions TF1 to TFm may be stored in a database or a suitable file system. Each transmission function TF1 to TFm describes a pulse response of at least one system component (K1 to Kp), which depends on the operating state, to the pressure pulse. The transmission functions TF1 to TFm may include a time-dependent component, which makes it possible to determine the corresponding output variable at any point in time, given knowledge of the chronological course of an input variable. For a specific system component K1, a plurality of transmission functions TF1, TF2, TF3 may be stored. There is thus a 1:n relationship between a system component and the transmission functions. Thus the number m of system component-specific transmission functions TF1 to TFm may be greater than the number p of the corresponding system components K1 to Kp. For example, the transmission function TF1 can describe the undisturbed operating state of a sand filter K1, and transmission functions TF2, TF3 can describe the operating state of the same filter K1 accordingly as a function of a disturbance variable (for example, illuviated particles) or during a cleaning run. In the case of a time-dependent transmission function, these operating states of the same filter may be calculated at the various points in time with the help of a single transmission function.

Figure 2:
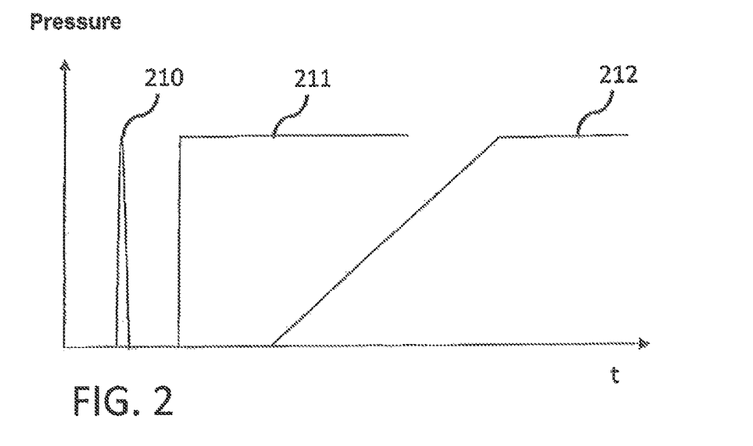
FIG. 2 illustrates various examples of a pressure pulse according to the invention.

For each system component K1 to Kn, at least one transmission function for undisturbed operation and one transmission function to describe the influence of a disturbance variable may be stored. For the case when the disturbance variable can be described as a function of time $z(t)$ and the point in time $t=0$ corresponds to the undisturbed state, a single time-dependent transmission function can describe both undisturbed operation and operation under the influence of a disturbance variable. FIG. 2 illustrates in detail how the change in the pressure difference caused by the illuviated particles over time can be represented as damping of the corresponding subsystem as a function of the time t in the case of the pressure difference in system filter components (all system components which have a filtration function).

The evaluation unit 130 (for example, by means of the GTF determination component 131) can calculate a transmission function for the overall production system 200 from the transmission functions of the individual system components which describe an undisturbed operating state. A comparator component 132 of the evaluation unit 130 can then compare the real transmission function GTF with the calculated transmission function for the production system in the undisturbed operating state and can determine any possible deviations. By comparing the real system transmission function GTF with the stored plurality of transmission functions TF1 to TFm, the comparator 132 may also determine which of the system components K1 to Kp deviates from the undisturbed state and in which way. The transmission functions may be representations of the pulse responses of the respective system components in the frequency range. In other words, a frequency spectrum images an operating-state-dependent chronological pulse response of the respective system component in the frequency range over time and a comparison with the real system transmission function can take place by a comparison of the corresponding frequency spectra and thus ultimately the operating state of a specific system component K1 to Kp of the production system 200 can be determined. In a comparison of the frequency spectra, the frequencies of the spectral lines as well as the amplitudes of the spectral lines are characteristic of the respective operating state.

For system components whose respective operating state produces only a change in the amplitude in the frequency spectrum at the same frequency, the corresponding system components can be deduced directly from the real system transmission function on the basis of their characteristic frequencies. Then it is possible to infer the operating state of the respective component based on the change in amplitude.

For system components whose altered operating state also gradually entails a change in the characteristic frequencies for the respective system component, first the system component(s) that is (are) responsible for deviations from the undisturbed state can be inferred by a frequency comparison of the real system transmission function with the system transmission function calculated for the undisturbed state. Then in turn the actual operating state can be inferred via the corresponding amplitudes in the real transmission function by comparison with the corresponding component-specific transmission functions.

The production system may also include another pressure sensor (not shown here). The computer system may receive a third pressure pulse signal from this third pressure sensor, this pressure pulse signal characterizing an absolute drop in pressure in the production system and being taken into account in determining the transmission function for the production system. The transmission function can be differentiated in conjunction with the following production/cleaning steps for a dynamic operating state and a static operating state. The dynamic state occurs, for example, when the inlet valve of a downstream system component or system further processing unit is open (for example, reverse osmosis). Flow through the production system is thus >0 L/min in the dynamic state. In this state the pressure pulse can propagate through the production system and the method described previously for determining the operating state of individual system components can be performed. In the static state, the downstream further processing unit is not active. The upstream further processing (e.g., dialysis water-processing) maintains a static pressure >0 bar. The flow in the static state is 0 L/min. In the static state, it is possible to test the production system for leakage by means of a pressure difference analysis. For example, there is a leak in the production system if the pressure at one of the pressure sensors drops for an unplanned reason.

The computer system may optionally also have an output unit (e.g., monitor, printer, etc.) which visualizes the status determined for the production system for a user. For example, the operating states of the system components may be characterized accordingly in a system design of the production system. For example, this may be achieved by color coding (e.g., green for undisturbed, red for blockage, blue for cleaning, etc.) or by graphic animation (flashing, pulsating, etc.).

Figure 3A:
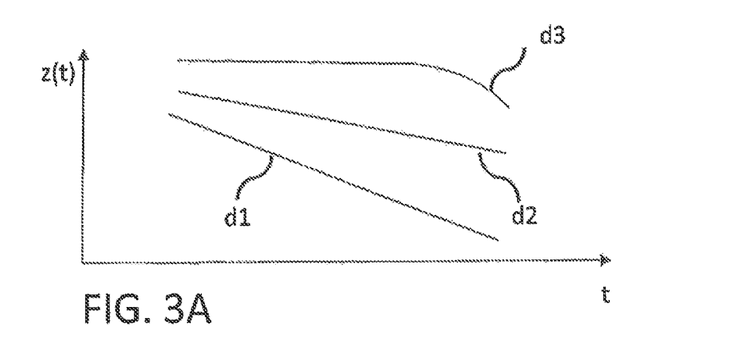
FIG. 3a shows as an example damping characteristic lines of system components with a damping behavior that decreases over time.
Figure 3B:
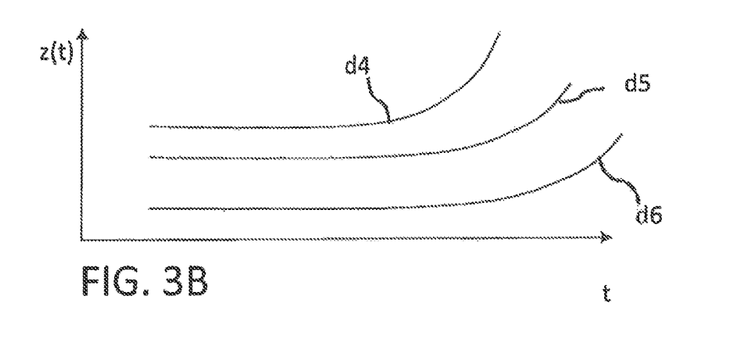
FIG. 3b shows as an example damping characteristic lines of system components with a damping behavior that increases over time.

FIGS. 3A and 3B show examples of a few damping characteristics (disturbance functions z(t)) for various types of system component production systems. FIG. 3A shows damping characteristics of system components whose damping behavior decreases over time. Damping characteristic d1 shows a typical curve of the damping behavior over time for an untreated water input unit. Damping characteristic d2 shows a typical curve of the damping behavior over time for a tubing line. Damping characteristic d3 shows a typical curve of the damping behavior over time for a water softener. FIG. 3B shows damping curves of system components whose damping behavior increases over time. Damping curve d4 represents a typical curve of the damping behavior over time for a media filter. Particle filters have a similar characteristic. Damping characteristics d5 and d6 show typical curves of the damping behavior over time for two different activated carbon filters.

Figure 4A:
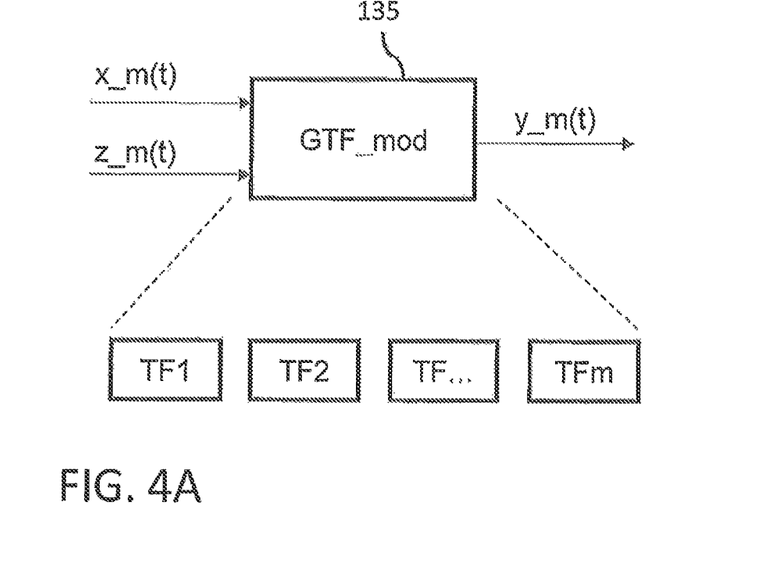
FIG. 4a illustrates the calculation of a time-dependent model transmission function for the entire cascading production system.

FIG. 4A illustrates the calculation of a time-dependent model transmission function GTF_mod 135 for the entire cascading production system. The model transmission function GTF_mod is obtained from the component-specific transmission functions TF1 to TFm and supplies the model pulse response y_m(t) of the production system as a response to the input x_m(t) (pressure pulse) under the influence of a time-dependent disturbance variable z_m(t). The time-dependent disturbance variable z_m(t) corresponds to the total disturbance influence of all system components and thus represents the model disturbance function of the system as a whole which is obtained on the basis of all system component-specific damping characteristics.

Figure 4B:
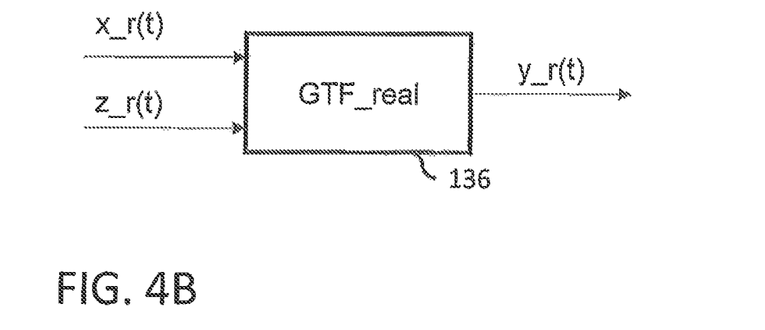
FIG. 4b illustrates the real transmission function for the entire cascading production system.

FIG. 4B illustrates the real transmission function, determined on the basis of the pressure pulse signals, of the GTF_real 136 of the production system, where x_r(t) represents the first measured/determined pressure pulse signal and y_r(t) represents the second measured pressure pulse signal (pulse response); z_r(t) characterizes the actual system damping, which is ultimately caused by the actual operating state of all system components as long as there are no additional pressure losses, such as those due to the use of a pressureless tank, a sedimentation basin or a similar cause, for example. The influence of such absolute pressure losses can be measured by determining the absolute pressure by means of another sensor in the production system and then can enter the calculation of the real transmission function of the overall system accordingly. For example, the pressure pulse on a pressureless tank in the system can be measured by means of such an additional pressure sensor. Due to the additional pressure sensor, it is possible to divide the total transmission function of the system between two successive transmission functions, where each of these partial transmission functions images the pulse response of the respective subsystem before or after the pressureless tank. The change in the pressure difference determined by the two sensors is to be equated with the damping of the system as a function of time. If this involves the system components which have a filtration efficiency, such as the filter components in FIG. 3B, then the disturbance variable z_r(t) depends on the number of illuviated particles in the respective filter.

Figure 5:
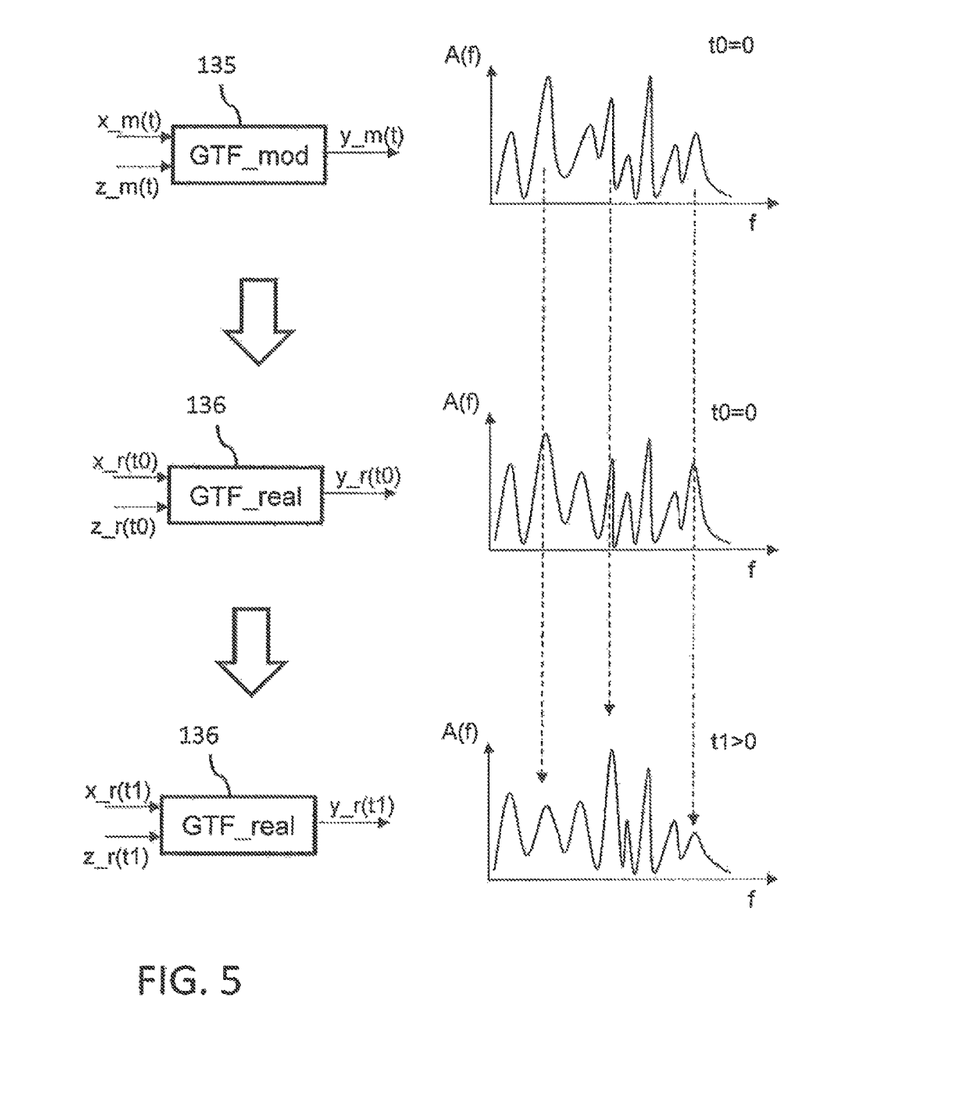
FIG. 5 illustrates an embodiment according to the invention for comparing a real transmission function with a model transmission function.

FIG. 5 illustrates an embodiment according to the invention for comparing the real transmission function GTF_real 139 with the model transmission function GTF_mod 135, which is obtained from the stored transmission functions of the individual system components. FIG. 5 illustrates three steps as indicated by the arrows, which can be processed from top to bottom in the order indicated. In the first step, the system calculates the model transmission function GTF_mod 135 for the production system. The pulse response y_m(t) to a pressure pulse can be determined with GTF_mod. This figure shows an example of the model pulse response in the frequency range at the point in time t0=0 (undisturbed operating state of the production system). The frequency f and the amplitudes A(f) of individual frequency spectral lines here represent characteristic lines for the individual system components. In the second step, the real system transmission function GTF_real 136 is determined on the basis of the first and second pressure pulse signals. The frequency spectrum at time t0=0 illustrated here shows an extensive correspondence with the frequency spectrum on the basis of the model transmission function. This suggests an undisturbed operation of the production system at the time t0=0.

In a third step, the real system transmission function GTE_real 136 at the time t1>0 is determined. At this time, particles are already illuviated in one or more filter components, leading to an altered damping of the system as a whole. In the spectral analysis of the pulse response, the three spectral lines marked with dotted-line arrows show significant deviations from the undisturbed state. The system components responsible for the respective spectral lines can be determined from the model transmission function GTF_mod. In addition, the type and extent of the disturbance can be deduced from the deviation in the amplitude and/or the frequency of the spectral lines because the time-dependent transmission function that follows from this can be determined for the system as a whole by means of the time-dependent transmission functions of the affected system components and thus GTF_mod at time t1 can be calculated. The model calculation may be compared with the real measurement on the basis of the modeled pulse response as well as the real pulse response and also on the basis of the modeled and real transmission functions.

For the case when the production system includes a plurality of system components of the same type, which have the same or similar transmission functions, the system cannot readily infer the special system components that are in a non-undisturbed operating system merely on the basis of the analysis according to the invention. For such a case, for example, different instances of system components of the same type may be provided with integrated flow envelopes, such that each flow-through envelope causes a defined pressure drop at the respective system component. This defined pressure drop is added to the respective component-specific pressure drop and results in the frequency spectrum of the corresponding component-specific transmission function being altered. The flow-through envelopes should be adapted to the sensor accuracy of the pressure measurement sensors as well as to the system components in the processing stages used. Integrated flow-through envelopes of different dimensions can thus make the transmission functions of system components of the same type distinguishable. The same principle can also be applied to redundant processing steps of the production system.

On the basis of this analysis, cleaning states of the individual components can be recognized by means of suitable component-specific transmission functions, among other things. The computer system can thus determine automatically which type of cleaning has already been performed and whether it was properly completed. The cleaning cycles can be determined primarily from the analysis of the transmission functions. This enables the computer system to order the cleaning operations in the production system to be coordinated in time. For example, on the basis of the analysis of the pressure pulse signals and the corresponding overall transmission function and/or component-specific transmission functions, it is possible to perform a demand-controlled backwashing of a sand filter, for example, or a demand-controlled replacement of deep filter cartridges. This reduces consumption of the fluid (e.g., water) and the current consumption caused by the production system as well as consumable materials as a function of the disturbance variable z(t). The computer system can trigger corresponding actuators in a demand-controlled process by triggering actuator signals via the interface to the production system; these actuators alter the flow-through behavior of the fluid in the production system. For example, the actuators may set in motion the corresponding regeneration and/or rinsing operations in a demand-controlled process. In general terms, actuators may be used through a corresponding triggering to alter the flow rate or the flow-through path.

For example, this can be achieved by way of controllable throttle valves,
bypass switches, which divert the flow to a bypass path in response to control,
pressure switches, or
other shunt actuators (e.g., Y shunts).

The production system thus operates through the computer monitoring system according to the invention as a function of the real fluid quality which is supplied by the system (for example, through normal operation or cleaning operation).

If the cascading production system is a dialysis water-processing system, then the computer system can monitor the following factors when using the production system accordingly:
leakage of the production system
loading of the filter cartridges with disturbance variables and replacement times for filter cartridges
backwashing times of filters, for example, sand filters or activated carbon filters as a function of the disturbance variables thus introduced
regeneration points in time for the water softener in combination with a water hardness measuring device and the resulting times for refilling salt for softening of water.

In addition to the first and second pressure sensor, the production system may also have other pairs of sensors which are suitable for measuring technical parameters of the production system such as chlorine content, water hardness, iron content or pH. Component-specific transmission functions can also be stored in the monitoring system for these technical parameters, and additional information can be obtained from these technical parameters about the operating state of the individual system components in a similar manner for the pressure parameters. Reducing the number of sensors according to the invention makes the entire system more robust and requires less maintenance.

The computer system may also manage rules in the evaluation unit which permit an adjustment of the alarm limits by comparison of the model transmission functions with real transmission functions, so that an alarm is triggered when these limits are exceeded, signaling that the operating state of the production system is no longer acceptable. For example, one such alarm limit may be set for a damping value which corresponds to a filter blocking.

The various pressure pulse forms in FIG. 2 may also be used to draw inferences regarding the leakage of the entire production system from the resulting system response and to calibrate damping functions for the system component-specific transmission functions and to set new alarm limits, compare them or trigger them, in addition to determining the operating states of individual system components.

Figure 6:
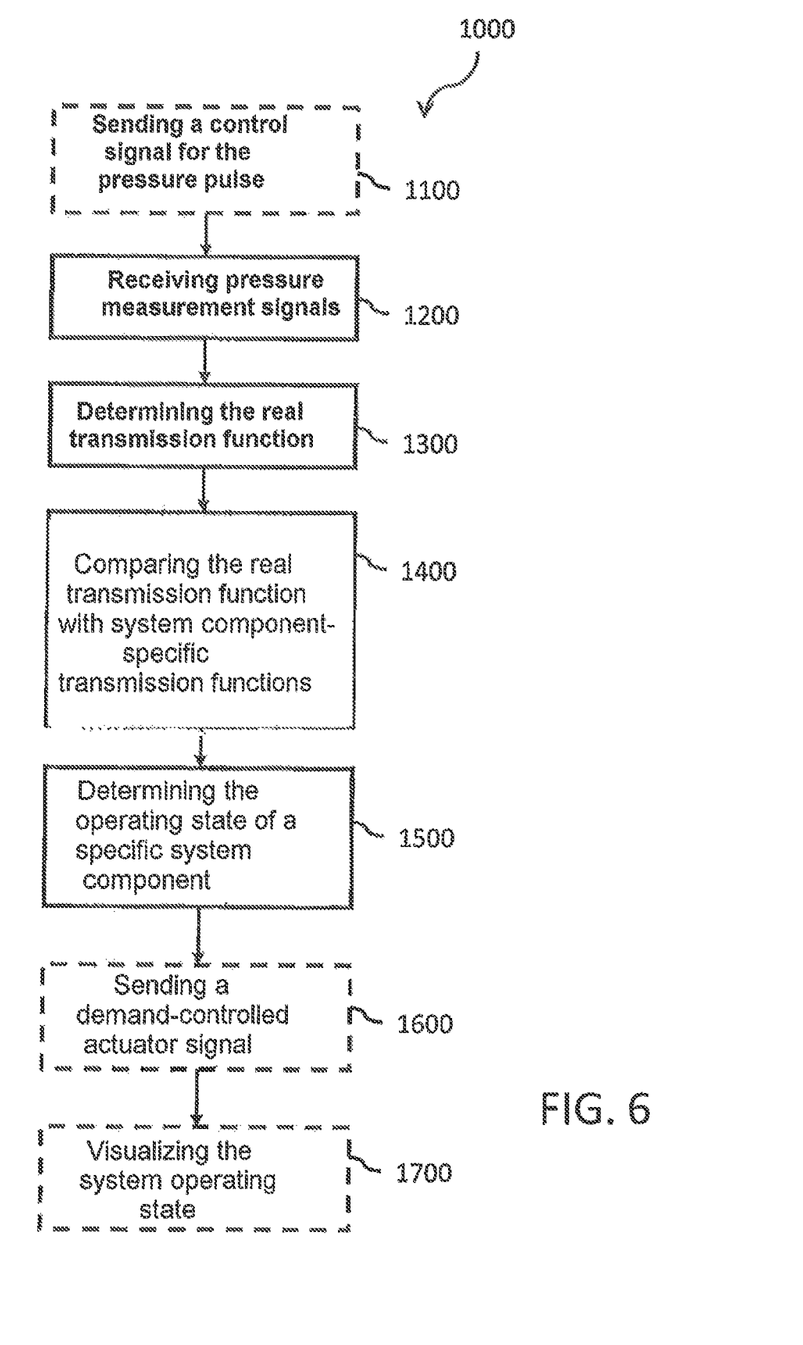
FIG. 6 shows a simplified flow chart of a computer-implemented method according to the invention.

FIG. 6 shows a simplified flowchart of a computer-implemented method 1000 according to the invention for determining an operating state of at least one system component in a fluid-carrying, cascading production system. Steps in blocks shown with dotted lines are to be understood as optional steps.

The individual steps of the computer-implemented method may be performed by the components of the computer system 100 (cf. FIG. 1). The computer system receives 1200 a first and a second pressure pulse signal from a first and a second pressure sensor of the production system wherein the first pressure pulse signal characterizes a pressure pulse before it passes through the production system, and the second pressure pulse signal characterizes the pressure pulse after it has passed through the production system. The computer system then determines 1300 a real transmission function for the production system from the first and second pressure pulse signals. The real transmission function of the production system is then compared 1400 with a stored plurality of system component-specific transmission functions, such that a system component-specific transmission function describes an operating-state-dependent pulse response of at least one system component to the pressure pulse. Finally, the computer system can determine 1500 operating states of a specific system component of the production system on the basis of the result of the comparison. The steps of comparison 1400 and determination 1500 may use a neural network for classifying the real transmission function of the production system with regard to the operating states of the system components. The transmission functions of the system components may be stored as frequency spectra. Each frequency spectrum forms an operating state-dependent pulse response of a respective system component in the frequency range. The steps of comparing 1400 and determining 1500 are then performed in the frequency range.

The computer system may optionally generate a control signal for generating the pressure pulse in the production system and may send it 1100 to a pulse generator of the production system. This step may be performed at the start of the method.

After the computer system has detected a demand for regeneration or rinsing on the basis of the determination of the operating state for a specific component, it may optionally send 1600 a demand-controlled actuator signal to the production system wherein the actuator signal is able to trigger an actuator in the production system to set the regeneration and/or rinsing process in motion.

Those skilled in the art can easily include the previously disclosed advantageous embodiments of the computer system in the considerations for implementing the computer-implemented method.

The computer-implemented method 1000 may be carried out, for example, by the computer system described in conjunction with FIG. 1 if the computer system processes a computer program with instructions, which implement the algorithm of the process.

Embodiments of the invention may be implemented in the form of digital circuits, computer hardware, firmware, software or in any combinations thereof. The invention may also be implemented in the form of a computer program product, e.g., a computer program on a physical information carrier (e.g., machine-readable memory medium) to be executed by a data processing device (e.g., programmable processor, computer or communicatively linked computer) or to control the operation thereof. A computer program product as claimed can be created in any program language, but compiled or interpreted languages are also included. It may be used in any form, for example, as a stand-alone program, module, component, subprogram or as another unit which is suitable for being used in a data processing system.

The computer program can be executed by a computer or may also be distributed either at one location or over multiple locations through a plurality of computers that are interlinked over a communication network. A computer-implemented method may be executed by execution of corresponding computer program products on corresponding data processing devices.

Process steps according to the invention may be executed by one or more programmable processors by running the computer program to execute the functions according to the invention, wherein input data are processed and corresponding output data are generated. The process steps may also be carried out by special logic modules such as, for example, field-programmable gate arrays (FPGAs) or application-specific integrated circuits (ASICs).

Examples of processors that are suitable for executing the computer program contain general or specialized microprocessors and any one or more processor solution of any digital computer. In general, a processor receives instructions and data from a read-only memory (ROM) or a random-access memory (RAM) or from both. The essential elements of a computer include at least one processor and one or more memory media for storing data and instructions. In general a computer is also coupled to one or more mass memory media (e.g., magnetic, magneto-optical, optical or solid-state (SSD) memory media) to receive data therefrom or to store data there. Such memory media may also be supplied on demand or by access over the Internet (e.g., cloud computing). Suitable data media for storing program instructions and data include all types of nonvolatile memory elements, such as semiconductor memory elements (e.g., EPROM, EEPROM), flash memory devices, magnetic or magneto-optical storage media, CD-ROMs, DVD-ROMs or Blue Ray disks. The processor and memory elements may be supplemented by special logic modules or may be part of these.

To permit interaction with the user, the invention may be implemented on a computer which includes at least one output device (e.g., LCD monitor, loudspeaker, etc.) and at least one input device (e.g., keyboard, touchscreen, microphone, pointing device, such as a mouse or trackball).

The invention may also be implemented on a data processing device which comprises a backend component (e.g., data server) or a middleware component (e.g., application server) or a front end component (e.g., client computer with a graphical user interface or web browser), over which the user can interact with an embodiment of the invention, or any combination of backend, middleware and frontend components.

Client computers may also be mobile terminals such as, for example, smartphones, tablet PCs or any portable computer device. The components of the system may be communicatively linked together (e.g., by means of a communication network such as a local area network LAN or a wide area network WAN, Internet or wireless LAN or telecommunications networks).

The computer system may comprise clients and servers. A client and a server are generally separated physically from one another and interact over a communications network. The relationship between the client and server occurs here through computer programs, which are executed on the respective computers and which have a client-server relationship to one another.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A computer system for determining an operating state of at least one system component (Kl to Kp) in a fluid-carrying, cascading production system, said computer system comprising:
   an interface configured to receive a first and a second pressure pulse signal, with the first pressure pulse signal characterizing a pressure pulse before the pressure pulse has passed through the production system, and the second pressure pulse signal characterizing the pressure pulse after the pressure pulse has passed through the production system;
   a memory unit configured to a store a plurality of system component-specific transmission functions (TFl to TFm), with a system component-specific transmission function (TFl to TFm) describing an operating-state-dependent pulse response of the at least one system component (Kl to Kp) to the pressure pulse as the pressure pulse is incoming; and
   an evaluation unit configured to determine a real transmission function for the production system from the first and the second pressure pulse signal and to compare the real transmission function of the production system with the stored plurality of transmission functions (TFl to TFm) for the system components, in order to determine the operating state of a specific system component (Kl to Kp) of the production system.

2. The computer system according to claim 1, wherein the interface is configured to receive a third pressure pulse signal which characterizes an absolute pressure drop in the production system and is taken into account in determining the transmission function for the production system.

3. The computer system according to claim 1, further comprising a signal generator configured to generate a control signal for generating the pressure pulse in the production system.

4. The computer system according to claim 1, wherein the transmission functions (TFl to TFm) of the system components (Kl to Kp) are stored as frequency spectra, and each frequency spectrum images an operating-state-dependent pulse response of a respective system component in the frequency range.

5. The computer system according to claim 4, wherein a change in the operating state of a specific system component corresponds to a change in the respective frequency spectrum in a characteristic frequency and/or the frequency amplitude.

6. A fluid-carrying, cascading production system comprising
   a plurality of cascading system components (Kl to Kp) for processing a fluid in the production system,
   a pressure-pulse-generating component (PG) for generating a pressure pulse at a location in the production system which is upstream from the cascading system components(Kl to Kp) of the production system relative to a direction of propagation of a pressure wave triggered by the pressure pulse,
   at least one pressure sensor (S1, S2) for detecting a pressure pulse signal at a location in the production system which is downstream from a last of the cascading system components relative to the direction of propagation of the pressure wave triggered by the pressure pulse, and
   a computer system according to claim 1.

7. The production system according to claim 6, wherein at least one of the system components (Kl to Kp) is selected from the group consisting of an untreated water inlet unit, an untreated water tank, a media filter, a particle filter, a water softener, an activated carbon filter, a deep filter cartridge, a coarse filter, and a spiral filter.

8. The production system according to claim 6, wherein a plurality of different instances of system components of the same type of component is provided with differently adjusted integrated flow envelopes so that each of the instances with a respective integrated flow envelope thereof has a differentiable component-specific transmission function.

9. The production system according to claim 6, further comprises at least one actuator configured to alter a flow behavior of the fluid in response to a demand-controlled actuator signal received by the computer system of the production system.

10. A computer-implemented method for determining an operating state of at least one system component (Kl to Kp) in a fluid-carrying, cascading production system, said computer-implemented method comprising the steps of:
   receiving a first and a second pressure pulse signal, with the first pressure pulse signal characterizing a pressure pulse before the pressure pulse has passed through the production system and the second pressure pulse signal characterizing the pressure pulse after the pressure pulse has passed through the production system;
   determining a real transmission function for the production system from the first and the second pressure pulse signal;
   comparing the real transmission function of the production system with a stored plurality of system component-specific transmission functions (TFl to TFm), with a system component-specific transmission function (TFl to TFm) describing an operating-state-dependent pulse response of the at least one system component (Kl to Kp) to the pressure pulse as the pressure pulse is incoming; and
   determining the operating state of a specific system component (Kl to Kp) of the production system based on a result of the step of comparing.

11. A computer-implemented method according to claim 10, further comprising a step of sending a control signal for generating the pressure pulse in the production system.

12. The computer-implemented method according to claim 10, further comprising a step of sending a demand-controlled actuator signal to the production system, wherein the actuator signal is configured to trigger in the production system an actuator for initiating at least one of the a regeneration operation and a rinsing operation.

13. The computer-implemented method according to claim 10, wherein the transmission functions (TF1 to TFm) of the system components (K1 to Kp) are stored as frequency spectra, and each frequency spectrum images an operating-state-dependent pulse response of a respective system component in the frequency range, and the steps are compared and a determination is performed in the frequency range.

14. The computer-implemented method according to claim 10, wherein the steps of comparing, and of determining the operating state, use a neural network for classifying the transmission function of the production system with regard to the operating states of the system components.

15. A computer program product, comprising instructions which perform the computer-implemented method according to claim 10 upon being loaded into at least one memory module of a computer system and processing by at least one processor of the computer system.

16. A fluid-carrying, cascading production system comprising:
- a plurality of cascading system components (K1 to Kp) that process a fluid in the production system;
- a pressure-pulse-generating component (PG) that generates a pressure pulse at a location in the production system which is upstream from the cascading system (K1 to Kp) relative to a direction of propagation of a pressure wave triggered by the pressure pulse;
- a pressure sensor (S1, S2) that detects a pressure pulse signal at a location in the production system which is downstream from a last of the cascading system components (K1 to Kp) relative to the direction of propagation of the pressure wave triggered by the pressure pulse; and
- a computer system that determines an operating state of at least on of the system components (K1 to Kp), the computer system including
- an interface configured to receive a first and a second pressure pulse signal, with the first pressure pulse signal characterizing a pressure pulse before the pressure pulse has passed through the production system, and the second pressure pulse signal characterizing the pressure pulse after the pressure pulse has passed through the production system,
- a memory unit configured to store a plurality of system component-specific transmission functions (TF1 to TFm), with a system component-specific transmission function (TF1 to TFm) describing an operating-state-dependent pulse response of the at least one system component (K1 to Kp) to the pressure pulse, and
- an evaluation unit configured to determine a real transmission function for the production system from the first and the second pressure pulse signal and to compare the real transmission function of the production system with the stored plurality of transmission functions (TF1 to TFm) for the system components, in order to determine the operating state of a specific system component (K1 to Kp) of the production system.

17. The production system according to claim 16, wherein at least one of the system components (K1 to Kp) is selected from the group consisting of an untreated water inlet unit, an untreated water tank, a media filter, a particle filter, a water softener, an activated carbon filter, a deep filter cartridge, coarse filter, and a spiral filter.

18. The production system according to claim 16, wherein a plurality of different instances of system components of the same type of component is provided with differently adjusted integrated flow envelopes so that each of the instances with a respective integrated flow envelope thereof has a differentiable component-specific transmission function.

19. The production system according to claim 16, further comprising at least one actuator configured to alter a flow behavior of the fluid in response to a demand-controlled actuator signal received by the computer system of the production system.

20. The production system according to claim 16, wherein in the computer system, the transmission functions (TF1 to TFm) of the system components (K1 to Kp) are stored as frequency spectra, and each frequency spectrum images an operating-state-dependent pulse response of a respective system component in the frequency range.

* * * * *